(12) United States Patent
Chang et al.

(10) Patent No.: US 8,881,174 B2
(45) Date of Patent: Nov. 4, 2014

(54) COMPUTING DEVICE AND FUNCTION MODULE MANAGEMENT METHOD

(71) Applicants: Chih-Kuang Chang, New Taipei (TW); Xin-Yuan Wu, Shenzhen (CN); Xiao-Long Chen, Shenzhen (CN)

(72) Inventors: Chih-Kuang Chang, New Taipei (TW); Xin-Yuan Wu, Shenzhen (CN); Xiao-Long Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/659,959

(22) Filed: Oct. 25, 2012

(65) Prior Publication Data
US 2013/0145382 A1    Jun. 6, 2013

(30) Foreign Application Priority Data
Dec. 3, 2011 (CN) .......................... 2011 1 0396367

(51) Int. Cl.
G06F 3/00    (2006.01)
G06F 9/44    (2006.01)
G06F 9/46    (2006.01)
G06F 13/00   (2006.01)

(52) U.S. Cl.
USPC ............................ 719/318; 719/313; 719/330

(58) Field of Classification Search
None
See application file for complete search history.

(56) References Cited

U.S. PATENT DOCUMENTS

| | | | |
|---|---|---|---|
| 5,682,027 A * | 10/1997 | Bertina et al. | 235/380 |
| 2003/0172127 A1* | 9/2003 | Northrup et al. | 709/219 |
| 2007/0189509 A1* | 8/2007 | Foody et al. | 380/2 |
| 2009/0037894 A1* | 2/2009 | Unger | 717/162 |

* cited by examiner

Primary Examiner — H S Sough
Assistant Examiner — Craig Dorais
(74) Attorney, Agent, or Firm — Novak Druce Connolly Bove + Quigg LLP

(57) ABSTRACT

A method for managing function modules using a computing device. The computing device loads the function modules according to a serial number corresponding to a filename and a directory path of each function module. The computing device obtains register commands from an interface of each function module and saves the register commands into a command library. The computing device searches for a register command in the command library when the register command is inputted by an input device connected to the computing device, and executes the searched register command of the function module.

12 Claims, 3 Drawing Sheets

US 8,881,174 B2

COMPUTING DEVICE AND FUNCTION MODULE MANAGEMENT METHOD

BACKGROUND

1. Technical Field

Embodiments of the present disclosure generally relate to management technology, and more particularly to a function module management method using a computing device.

2. Description of Related Art

A function module provides a functionality (e.g., starting a dialog box) when the function module is started or accessed. The function module may include one or more commands However, at present, the one or more commands of one function module do not integrate with the commands of another function module. If a user wants to search for a command of the function module, the user needs to manually search the function modules one by one, which is time-consuming, especially when searching many function modules. Furthermore, if the coupling among the function modules are high, a change in one function module usually forces a ripple effect of changes in other function modules. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
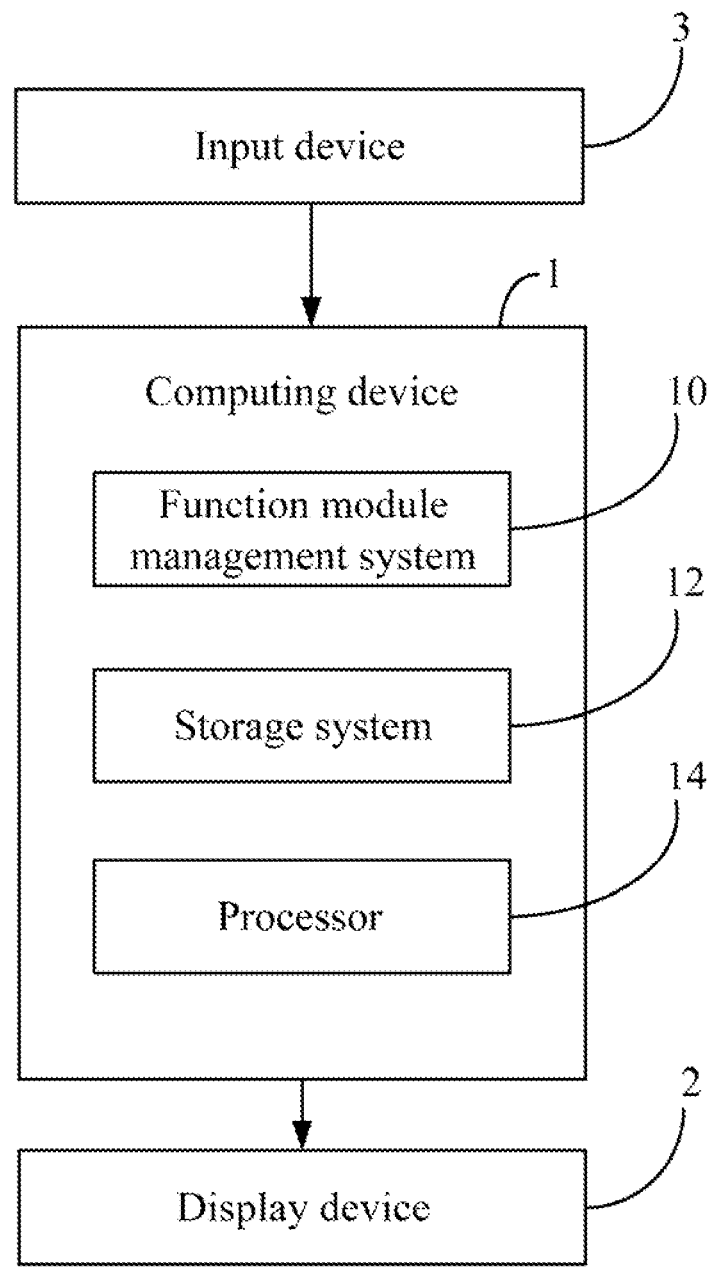
FIG. 1 is a schematic block diagram of one embodiment of a computing device including a function module management system.

FIG. 1 is a block diagram of one embodiment of a computing device 1 including a function module management system 10. In the embodiment, the function module management system 10 are implemented by the computing device 1. The function module management system 10 may be used to automatically manage function modules. In one embodiment, each function module provides a functionality when the function module is started or accessed. For example, if the function module relates to starting a dialog box, when the function module is started, a dialog box is displayed on a display device 2. The function module may be a dynamic link library (dll) file.

The computing device 1 is connected to an input device 3, such as a keyboard, and a mouse. The input device 3 may be used to input various computing device signals or software interfaces. The computing device 1 provides an operation interface for a user to control one or more operations of the computing device 1.

In one embodiment, the computing deice 1 may be a computer, a server, a portable electronic device, or any other electronic device that includes a storage system 12, and at least one processor 14. In one embodiment, the storage system 12 may be a magnetic or an optical storage system, such as a hard disk drive (HDD), an optical drive, a compact disc, a digital video disc, a tape drive, a cache, a flash memory, an EPROM, or other suitable storage medium. The storage system stores the function modules. The processor 14 may be a central processing unit including a math co-processor, for example.

The computing device 1 is connected to the display device 2. The display device 2 is operable to display result (e.g., show the dialog box) when each function module is executed.

Figure 2:
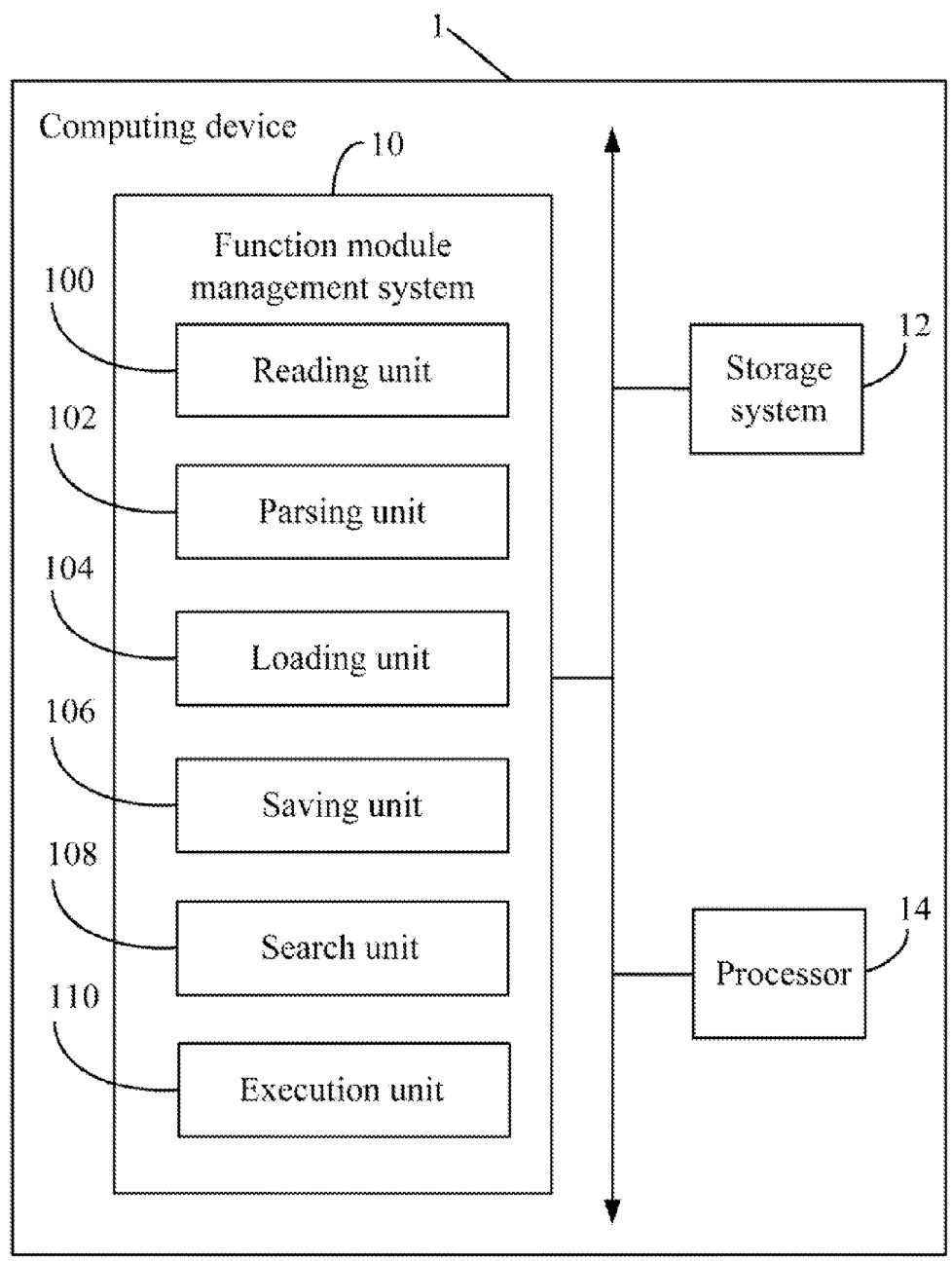
FIG. 2 is a schematic block diagram of one embodiment of the function module management system in FIG. 1.

FIG. 2 is a block diagram of one embodiment of the computing device 1 including a function module management system 10. In one embodiment, the function module management system 10 includes a reading unit 100, a parsing unit 102, a loading unit 104, a saving unit 106, a search unit 108, and an execution unit 110. The units 100-110 may include computerized code in the form of one or more programs that are stored in the storage system 12. The computerized code includes instructions that are executed by the at least one processor 14 to provide functions for units 100-110.

The reading unit 100 reads a predetermined file of function modules from the storage system 12. The predetermined file is predetermined by the user using the input device 3. The predetermined file may be saved as a specified format (e.g., a TXT format, WORD format, or PDF) into the storage system 12. The predetermined file includes information of each function module. The information of each function module includes a filename of each function module, a directory path (e.g., D:\A\US). The filename of each function module may include a file extension "dll". The filename of the function module may be "test.dll", or "X.dll", for example.

The parsing unit 102 parses the predetermined file of the function modules and obtains a list of the function modules. The list of the function modules includes a serial number corresponding to each filename, the filename and the directory path of each function module. In one embodiment, the parsing unit 102 assigns the serial number to each filename of each module function. The parsing unit 102 reads each filename of each module function in order (e.g., using first English letter of the filenames in order from A to Z). The serial number increases by one every time when the parsing unit 102 reads one filename of each function module. For example, when the parsing unit 102 reads the first filename "test.dll", a serial number "1" is assigned to the filename "test.dll". When the parsing unit 102 reads the second filename "X.dll", a serial number "2" is assigned to the filename "X.dll."

The loading unit 104 loads the function modules according to the list. In one embodiment, the loading unit obtains the serial number of each filename from the list, and loads the function modules one by one in order from the storage system 12 according to the directory path of each function module.

The saving unit 106 obtains register commands from an interface of each function module and saves the register commands into a command library. In one embodiment, each function module includes the interface. The interface of each function module is used for communication with other function modules. For example, when the function module is started, the interface of the function module is accessed by other function modules, and the register commands are obtained from the function module. Each register command is used to execute an operation (e.g., starting the dialog box) when the register command is invoked. The command library is a command set which includes the register commands of each function modules.

The search unit 108 searches for a register command in the command library when the register command is inputted by the input device 3. In one embodiment, the user inputs a keyword in the operation interface using the input device 3, and the search unit 108 uses the keyword to search if the name of the register commands includes the keyword. For example, if the user inputs the keyword "open," the name of the register commands which includes "open" is shown on the display device 2.

The execution unit 110 executes the searched register command of the function module and displays status information of the function module on the display device 2.

Figure 3:
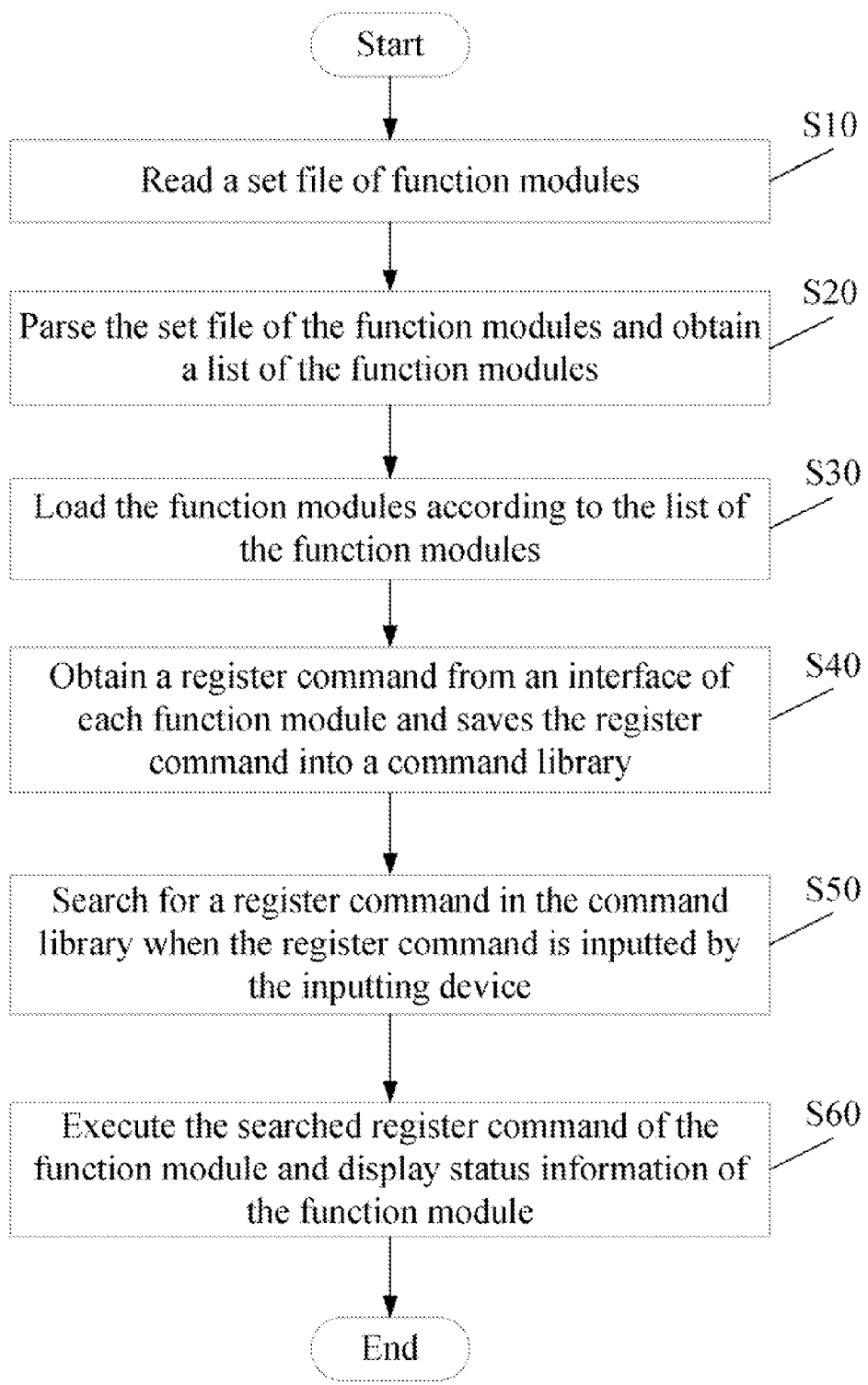
FIG. 3 is a flowchart illustrating one embodiment of a function module management method.

FIG. 3 is a flowchart illustrating one embodiment of a function module management method using the computing device 1 of FIG. 1. The method can be performed by the execution of a computer-readable program by the at least one processor 14 of the computing device 1. Depending on the embodiment, in FIG. 3, additional steps may be added, others removed, and the ordering of the steps may be changed.

In step S10, the reading unit 100 reads a predetermined file from the storage system 12. In one embodiment, the predetermined file includes a filename of each function module, and a directory path (e.g., D: \A\US) of each function module. The filename of the function module may be "test.dll," or "X.dll," for example.

In step S20, the parsing unit 102 parses the predetermined file of the function modules and obtains a list of the function modules. As mentioned above, the list of the function modules includes a serial number of each filename, filenames and directory paths of the function modules. In one embodiment, the serial number is generated when the parsing unit 102 reads each filename of each module function. For example, as mentioned above, when the parsing unit 102 reads the first filename "test.dll," the serial number "1" is assigned to the filename "test.dll." When the parsing unit 102 reads the second filename "X.dll", the serial number "2" is assigned to the filename "X.dll."

In step S30, the loading unit 104 loads the function modules according to the list. In one embodiment, the loading unit obtains the serial number of each filename from the list, and loads the function module one by one in order from the storage system 12 according to the directory path of each function module. For example, if the list includes two serial numbers "1" and "2," the serial number "1" corresponds to the filename "test.dll", and the serial number "2" corresponds to the filename "X.dll," the loading unit 104 obtains the serial number "1" first and loads the function module according to the directory path of the function module which has the filename "test.dll," then the loading unit 104 obtains the serial number "2" and loads the function module according to the directory path of the function module which has the filename "X.dll."

In step S40, the saving unit 106 obtains register commands from an interface of each function module and saves the register commands into a command library. In one embodiment, each function module includes the interface. The interface of each function module is used for communication with other function modules. For example, when the function module is started, the interface of the function module is accessed by other function module, and the register commands are obtained from the function module. Each register command is used to execute an operation (e.g., starting a dialog box) when the register command is invoked. The command library is a command set which includes the register commands of each function modules.

In step S50, the search unit 108 searches for a register command in the command library when the register command is inputted by the input device 3. As mentioned above, the user inputs a keyword in the operation interface using the input device 3 (e.g., the keyboard), and the search unit 108 uses the keyword to search if names of the register commands include the keyword. For example, if the user inputs the keyword "open," and the names of the register commands which include the "open" show in the display device 2.

In step S60, the execution unit 110 executes the searched register command of the function module and displays status information of the function module on the display device 2. For example, the register command is used to open a file (e.g., a WORD file), when the register command is executed, the WORD file is opened. The status information of the function module indicates the register command of the function module has been completely executed. The status information of the function module may be, but is not limited to, text information (e.g., "the operation to open the file has completely done") or image information (e.g., a smiley face.)

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
at least one processor;
a storage system; and
one or more programs stored in the storage system and being executable by the at least one processor, the one or more programs comprising:
a reading unit to read a predetermined file of function modules from the storage system, wherein the predetermined file comprises a filename and a directory path of each function module;
a parsing unit to parse the predetermined file of the function modules and obtains a list of the function modules, wherein the list comprises a serial number corresponding to each filename, and the directory path of each function module;
a loading unit to load the function modules according to the serial number corresponding to each filename and the directory path of each function module, wherein the loading unit obtains the serial number of each filename from the list, and loads the function modules one by one in order from the storage system according to the directory path of each function module;
a saving unit to obtain register commands from an interface of each function module and saves the register commands into a command library, the interface of each function module being used for communication with the other function modules, the interface of the function module being accessed by the other function module when the function module is started, and the register commands being obtained from the function module;
a search unit to search for a register command in the command library when the register command is inputted from an input device connected to the computing device; and
an execution unit to execute the searched register command of the function module, wherein the execution unit displays status information of the function module after the register command is executed, wherein the status information of the function module indicates the register command of the function module has been completely executed.

2. The computing device as described in claim 1, wherein the function module is a dynamic link library (dll) file.

3. The computing device as described in claim 1, wherein the serial number is assigned to the filename of the function module when the parsing unit reads the filename of the function module.

4. The computing device as described in claim 1, wherein the command library is a command set which comprises the register commands of each function modules.

5. A computer-implemented function module management method being performed by execution of computer readable program code by a processor of a computing device, the method comprising:

reading a predetermined file of function modules from a storage system of the computing device, wherein the predetermined file comprises a filename and a directory path of each function module;

parsing the predetermined file of the function modules and obtaining a list of the function modules, wherein the list comprises a serial number corresponding to each filename, and the directory path of each function module;

loading the function modules according to the serial number corresponding to each filename and the directory path of each function module, wherein the loading comprises obtaining the serial number of each filename from the list, and loading the function modules one by one in order from the storage system according to the directory path of each function module;

obtaining register commands from an interface of each function module and saving the register commands into a command library, the interface of each function module being used for communication with the other function modules, the interface of the function module being accessed by the other function module when the function module is started, and the register commands being obtained from the function module;

searching for a register command in the command library when the register command is inputted from an input device connected to the computing device;

executing the searched register command of the function module; and displaying status information of the function module after the register command is executed, wherein the status information of the function module indicates the register command of the function module has been completely executed.

6. The method as described in claim 5, wherein the function module is a dynamic link library (dll) file.

7. The method as described in claim 5, wherein the serial number is assigned to the filename of the function module when a parsing unit reads the filename of the function module.

8. The method as described in claim 5, wherein the command library is a command set which comprises the register commands of each function modules.

9. A non-transitory storage medium having stored thereon instructions that, when executed by a processor of a computing device, causes the computing device to perform a function module management method, the method comprising:

reading a predetermined file of function modules from a storage system of the computing device, wherein the predetermined file comprises a filename and a directory path of each function module;

parsing the predetermined file of the function modules and obtaining a list of the function modules, wherein the list comprises a serial number corresponding to each filename, and the directory path of each function module;

loading the function modules according to the serial number corresponding to each filename and the directory path of each function module, wherein the loading comprises obtaining the serial number of each filename from the list, and loading the function modules one by one in order from the storage system according to the directory path of each function module;

obtaining register commands from an interface of each function module and saving the register commands into a command library, the interface of each function module being used for communication with the other function modules, the interface of the function module being accessed by the other function module when the function module is started, and the register commands being obtained from the function module;

searching for a register command in the command library when the register command is inputted from an input device connected to the computing device;

executing the searched register command of the function module; and displaying status information of the function module after the register command is executed, wherein the status information of the function module indicates the register command of the function module has been completely executed.

10. The non-transitory storage medium as described in claim 9, wherein the function module is a dynamic link library (dll) file.

11. The non-transitory storage medium as described in claim 9, wherein the serial number is assigned to the filename of the function module when the filename of the function module is read.

12. The non-transitory storage medium as described in claim 9, wherein the command library is a command set which comprises the register commands of each function modules.

* * * * *